(12) United States Patent
Isaak et al.

(10) Patent No.: US 11,337,452 B2
(45) Date of Patent: May 24, 2022

(54) COOLING NOZZLE FOR EXTRUDER

(71) Applicant: DEUTSCHES INSTITUT FÜR LEBENSMITTELTECHNIK E.V, Quakenbrueck (DE)

(72) Inventors: Johann Isaak, Quakenbrueck (DE); Dimitri Reimer, Quakenbrueck (DE)

( * ) Notice: Subject to any disclaimer, the term of this patent is extended or adjusted under 35 U.S.C. 154(b) by 0 days.

(21) Appl. No.: 16/757,288

(22) PCT Filed: Dec. 21, 2018

(86) PCT No.: PCT/EP2018/086757
§ 371 (c)(1),
(2) Date: Apr. 17, 2020

(87) PCT Pub. No.: WO2019/129744
PCT Pub. Date: Jul. 4, 2019

(65) Prior Publication Data
US 2021/0219593 A1    Jul. 22, 2021

(30) Foreign Application Priority Data
Dec. 27, 2017  (DE) .......................... 102017223829.1

(51) Int. Cl.
*A23P 30/20*    (2016.01)
*B29C 48/87*    (2019.01)
(Continued)

(52) U.S. Cl.
CPC ................. *A23P 30/20* (2016.08); *A23J 3/26* (2013.01); *B05B 7/16* (2013.01); *B29C 48/09* (2019.02);
(Continued)

(58) Field of Classification Search
CPC ................ B29C 48/09; B29C 48/2566; B29C 48/25686; B29C 48/272; B29C 48/355; B29C 48/87; A23P 30/20; A23J 3/26
See application file for complete search history.

(56) References Cited

U.S. PATENT DOCUMENTS 1,368,658 A * 2/1921 Royle ..................... B29C 48/09
                                                      425/192 R
1,435,659 A * 11/1922 Roberts .................. B29C 48/08
                                                      264/146

(Continued)

FOREIGN PATENT DOCUMENTS

CN    202062627 U    12/2011
EP    0512146 A1    11/1992
EP    3222148 A1    9/2017

OTHER PUBLICATIONS

Written Opinion from the corresponding International Patent Application No. PCT/EP2018/086757, dated Jun. 30, 2020.
(Continued)

*Primary Examiner* — Xiao S Zhao
*Assistant Examiner* — Joseph S Leyson
(74) *Attorney, Agent, or Firm* — Greer, Burns & Crain, Ltd.; Steven P. Fallon (57) ABSTRACT

The invention relates to a cooling nozzle which has a product channel of annular cross-section the circumference of which is closed with the exception of at least one recess. Said recess has the effect that compound exiting the product channel spreads uniformly on a substrate if the compound is sufficiently solid after cooling during passage through the cooling nozzle so that it does not deliquesce on a flat substrate.

19 Claims, 5 Drawing Sheets

(51) Int. Cl.
    *B29C 48/25*      (2019.01)
    *B29C 48/27*      (2019.01)
    *B29C 48/09*      (2019.01)
    *A23J 3/26*       (2006.01)
    *B05B 7/16*       (2006.01)
    *B29C 48/355*     (2019.01)

(52) U.S. Cl.
    CPC .... *B29C 48/2566* (2019.02); *B29C 48/25686* (2019.02); *B29C 48/272* (2019.02); *B29C 48/87* (2019.02); *B29C 48/355* (2019.02)

(56) References Cited

U.S. PATENT DOCUMENTS

| | | |
|---|---|---|
| 5,333,538 A | 8/1994 | Sawa |
| 2015/0044334 A1 | 2/2015 | Walther et al. |

OTHER PUBLICATIONS

International Search Report for Application No. PCT/EP2018/086757, dated May 15, 2019.

* cited by examiner

COOLING NOZZLE FOR EXTRUDER

The present invention relates to a cooling nozzle for an extruder, as well to as a process for the production of extrudes masses that are in particular food masses, with the step of cooling the mass after exiting an extruder. The cooling nozzle is characterized by a structure that allows rapid cooling of extruded masses. The cooling nozzle is preferably connected at its product channel directly to the outlet of an extruder. The invention preferably relates to a combination of the cooling nozzle with a cleaning device that is adapted to the cooling nozzle, and to a process for cleaning the cooling nozzle.

For the process, food masses are preferably duroplastically hardening masses that solidify through heating, preferably through heating when passing through the extruder, e.g. to at least a temperature at which protein contained within the food mass denatures and/or starch gels.

It is known to cool extruded masses after exiting an extruder nozzle through contact with a cooling conveyor belt or by overflowing with a coolant.

US 2015/0044334 A1 describes an extruder with a nozzle that has a closed, annular cross-section for the production of protein masses having aligned fibers. This cross-section is delimited by a cooling jacket and an internally cooled cylinder lying coaxially therein that can be attached to the cooling jacket at the inlet by means of a carrier.

The invention has the object to provide an alternative nozzle for an extruder and to provide a process, which can effectively cool an extruded mass. Preferably, the nozzle should have a shape that allows easy cleaning, in particular of the product channel, from a food mass that is viscous or solidified therein. Preferably, a cleaning device should be provided for cleaning the product channel of the nozzle.

The invention achieves the object by the features of the claims and in particular by a cooling nozzle having a product channel having an annular cross-section that is circumferentially closed except for at least one recess, preferably except for exactly one recess. The recess leads to mass exiting from the product channel flatly spreading out onto a support, when the mass after cooling during the passage through the cooling nozzle is sufficiently solidified so that it does not flow on an even support. Therefore, the cooling nozzle forms a mass, which is positioned onto a support after exiting the cooling nozzle, into a flat single-layered layer that has a width corresponding to the circumference of the product channel minus the recess. Therein, it is not necessary to divide the mass along its direction of movement after exiting the product channel in order to place the mass onto the support in a continuous layer. The product channel is open at its opposite ends that lie between the ends, or front face surfaces respectively, of the inner tube and the inner jacket tube. Correspondingly, the cross-section of the product channel is open. Generally preferred, the cross-section of the product channel is annular and open, except for the carrier and optional webs, further preferred, the cross-section of the product channel is constant along its length.

The recess within the annular cross-section of the product channel is formed by at least one carrier, preferably exactly 1 carrier, which extends along the longitudinal axis of the inner tube over the entire length of the product channel and divides the cross-section of the product channel.

The product channel is open at both of its opposite ends, one of which forms an inlet opening and the other an outlet opening. The annular cross-section extends along the longitudinal axis of the product channel and is preferably constant over its length including both the opposing terminal openings. The product channel is formed by an inner jacket tube and an inner tube fixed therein by means of the carrier. The inner tube is arranged at a distance from the inner jacket tube by the carrier. The inner jacket tube is encompassed by an outer jacket tube, so that these form a double jacket around the inner tube. The outer jacket tube is preferably arranged concentrically at a radial distance around the inner jacket tube.

The carrier preferably extends in parallel to the longitudinal axis of the inner tube and between the inner jacket tube and the inner tube has two wall surfaces opposite to one another that are seamless and preferably smooth. The wall surfaces of the carrier contact the inner jacket tube and the outer jacket tube and form the recess in the mass flowing in the product channel. Therein, the wall surfaces continuously abut on the inner tube and on the inner jacket tube, so that the inner tube, the wall surfaces and the inner jacket tube form a product channel having a circumferentially closed cross-section. The carrier is firmly attached to the inner tube, e.g. by means of welding or screwing.

The carrier can be connected to the outer jacket tube, preferably the carrier is releasably connected to the inner jacket tube. Further preferably, the carrier is connected to the inner tube, e.g. by means of screwing or welding, and the carrier is releasably connected to the inner jacket tube and/or the outer jacket tube, e.g. by means of screwing. Generally, the product channel is fluid-tight against the outer coolant channel, e.g. in that the carrier abuts on the inner jacket tube and openings through the inner jacket tube are closed and/or sealingly overlaid by the carrier. The carrier can e.g. be connected to the inner jacket tube by screws that are guided through bore holes in the inner jacket tube and that engage in threaded bore holes in the carrier, wherein the screws preferably at most by the screw head protrude beyond the inner jacket tube into the outer coolant channel, more preferably the screws are flush with the inner jacket tube or are sunk into it. Therein, the outer jacket tube preferably has mounting bore holes that are aligned matchingly to the bore holes in the inner jacket tube and the threaded bore holes in the carrier, and that are closable through closures, e.g. screw caps. In this embodiment it is preferred that between the inner and the outer jacket tube, annular seals are arranged that enclose the mounting bore holes of the outer jacket tube and by which the outer coolant channel is closed against the mounting bore holes.

The wall surfaces of the carrier can run in perpendicular between the inner jacket tube and the inner tube, e.g. along the radials that originate from the central longitudinal axis of the inner tube and/or from the inner jacket tube. Alternatively, the wall surfaces of the carrier can have a curvature, e.g. having a radius equal to half the distance between the inner jacket tube and the inner tube. The wall surfaces of the carrier can have a curvature that is convex or preferably concave from the perspective of the product channel.

The outer cross-section of the inner tube and the inner cross-section of the inner jacket tube are preferably circular, in particular concentric to a joint longitudinal axis. Further preferably, the inner jacket tube has a circular outer cross-section and the outer jacket tube has a circular inner cross-section.

The double jacket of the inner jacket tube and the outer jacket tube forms an outer coolant channel that is closed at both its ends that lie opposite to one another along the longitudinal axis, e.g. closed by lids that overlay the open cross-section between the inner and the outer jacket tube. The outer coolant channel preferably has an annular cross-section. Optionally, within the outer coolant channel a flow guiding element is arranged that is configured to evenly distribute coolant flowing along the outer coolant channel over the circumference of the outer coolant channel. The flow guiding element can e.g. be a spiral running along the outer coolant channel that is e.g. arranged concentrically to the longitudinal axis of the outer coolant channel. Preferably, the flow guiding element extends over the entire radial cross-section of the outer coolant channel, or respectively abuts on the inner jacket tube and on the outer jacket tube. The outer coolant channel has a first inlet and, at a distance thereto, a first outlet for coolant, preferably the inlet and the outlet are arranged at the ends of the outer jacket tube that are opposite along the longitudinal axis. The first inlet and the first outlet are arranged e.g. through the outer jacket tube or are arranged through the lid that terminally overlays the open cross-section between the inner and the outer jacket tube.

The inner volume of the inner tube forms an inner coolant channel that is accessible for coolant through a second inlet and a second outlet spaced therefrom. The inner cross-section of the inner tube is closed at both of its opposite ends, e.g. by lids. The second inlet and the second outlet can be guided through the lids that terminally close the inner coolant channel.

Preferably, the second inlet and the second outlet are guided through the carrier and through the wall of the inner tube, e.g. in the form of a bore hole through the carrier and the wall of the inner tube. Preferably, the second inlet and/or the second outlet each have connection lines that are sealingly guided through bore holes in the outer jacket tube and which sealingly engage in bore holes running through the carrier and the wall of the inner tube, wherein such bore holes are arranged at the inner tube ends that are opposite along the longitudinal axis. The bore holes are preferably arranged at opposite ends of the carrier and form a second inlet and a second outlet for the inner coolant channel, wherein the bore holes are guided through the inner jacket tube and the inner tube. To the bore holes, connection lines are connected that are guided fluidproof through bore holes in the outer jacket tube, so that coolant can be guided through the connection lines and the bore holes independently from the outer coolant channel into the inner coolant channel and out of it.

The lids closing the outer coolant channel and the inner coolant channel at their terminal cross-sectional openings can be formed in one piece, e.g. can be connected to one another in perpendicular to the longitudinal axis of the cooling nozzle. The lids can alternatively be each formed separately, so that the terminal open cross-sections of the outer coolant channel and of the inner coolant channel, respectively, are closed by one lid each. Preferably, the lids are firmly attached to the inner tube and/or to the inner and/or to the outer jacket tube.

Optionally, the cooling nozzle can form a combination with an additional inner tube that is interchangeable against the one inner tube, wherein the additional inner tube has a different outer diameter. In combination of the cooling nozzle with at least one additional inner tube, preferably the carrier is connected to the inner tube and is releasably connectable to the inner and/or to the outer jacket tube, e.g. by means of screw connections, so that upon disengaging the connection of the carrier to the inner and/or outer jacket tube the inner tube with the carrier connected thereto can be removed from the inner jacket tube or respectively inserted into the inner jacket tube. In this embodiment of the cooling nozzle having at least two inner tubes, one of which is arranged inside the inner jacket tube and is connected to the inner and/or to the outer jacket tube through the carrier, the carrier of each inner tube preferably extends up to the same radius from the longitudinal central axis of the inner tube, so that each inner tube is held by the carrier concentrically to the inner jacket tube. In this preferred embodiment, the cooling nozzle allows the production of foods of different thickness by exchanging one inner tube for an additional inner tube having a different outer diameter.

Further optionally, an inner tube can have at least one web that extends parallel to the longitudinal axis of the inner tube, e.g. parallel to the carrier, along the inner tube, preferably over the entire length of the inner tube, and that protrudes over the outer surface of the inner tube. Preferably, the inner tube has at least two webs that are each arranged around the circumference of the inner tube equidistantly to one another and to the carrier. For instance, two webs and the carrier can be arranged parallel to the longitudinal axis of the inner tube and offset by 120° each around the longitudinal central axis of the inner tube, or respectively three webs and the carrier offset by 90° each. Preferably, the webs protrude over the inner tube up to the same radius, up to which the carrier protrudes over the inner tube.

Such webs in addition to the carrier partition the annular gap that is spanned between the inner jacket tube and the inner tube and that forms the product channel, so that the cooling nozzle is configured to divide the mass along its movement during the production process. Additionally, such webs cause a more intense development of structures, e.g. of fiber structures, within the food along the direction of movement through the cooling nozzle.

The optional webs can have side surfaces that run in perpendicular between the inner jacket tube and the inner tube, e.g. along the radials that originate from the central longitudinal axis of the inner tube and/or of the inner jacket tube. Alternatively, the side surfaces of the optional webs can have a curvature, e.g. having a radius equal to half the distance between inner jacket tube and inner tube. The side surfaces can have a curvature that is convex or preferably concave from the perspective of the product channel. The webs are not directly connected to the inner jacket tube. The webs are attached to the inner tube, e.g. are welded or screwed to the inner tube. Preferably, the webs end in a front face surface that is arranged in a small distance to the inner jacket tube, e.g. 0.2 mm up to 2 or up to 1 mm distance, or that is arranged adjacent to the inner jacket tube, or the webs abut on the inner tube. Generally, webs are not connected to the inner jacket tube, so that the inner tube is firmly connected to the inner jacket tube only by means of the carrier.

Generally preferably, the cooling nozzle is divided into axial sections, the ends of which are releasably connected to one another. A cooling nozzle having axial sections that are releasably connected to one another has the advantage that it can be disassembled into these sections for cleaning, and that the axial sections of the product channel therefore become accessible from their ends. For the releasable connection to one another, the axial sections each terminally have preferably each one circumferential edge or flange radially protruding over the outer jacket tube, which edge or flange can be releasably connected to the radially protruding edge or flange of an adjacent section by means of a clamp encompassing the flanges. Such an embodiment is suited to change the length of the cooling nozzle, e.g. for adaptation of the cooling nozzle upon change of product or to change the structure of a product by changing the length of the cooling nozzle. Accordingly, the process for production of foods can have the step of lengthening or shortening the cooling nozzle by at least one axial section, in particular in order to change the structure of the product and/or when extruding a different mass.

Preferably, the inner tube, the inner jacket tube and/or at least the wall surfaces of the carrier confining the product channel between the inner tube and the inner jacket tube, and/or the entire carrier independently of one another consist of stainless steel, plastic suitable for food or of metal coated with plastic, e.g. friction-reducing plastic, in particular PTFE (Teflon), or of metal coated with ceramic. Optionally, the inner tube, the inner jacket tube and/or at least the wall surfaces of the carrier, preferably the entire carrier, consist of stainless steel, optionally coated with plastic or ceramic.

The cooling nozzle with its product channel is preferably connected directly to the outlet of an extruder, wherein further preferred the cross-section of the extruder outlet is annular, in particular having the same annular cross-section as the product channel of the cooling nozzle. The extruder's outlet can be connected to the inlet opening of the product channel through a connecting piece.

Optionally, the connecting piece connecting the extruder's outlet to the inlet opening of the product channel in at least one section adjacent to the inlet opening of the product channel or over its entire length forms a product guiding channel having an annular cross-section. The annular product guiding channel can be formed by an inner wall and a spaced-apart outer wall, the distance being constant or the distance increasing or decreasing in the direction of flow. The inner wall and/or the outer wall can be cone-shaped.

Preferably, the connecting piece has a core piece in a jacket section that between them form a product channel, which product channel changes, e.g. enlarges, from the cross-section of an extruder outlet up to the cross-section of the product channel. Therein, the core piece in the preferred embodiment has a catch that connects the core piece to the jacket section and that preferably has a cross-section equal to the cross-section of the carrier, so that the catch occupies a proportion of the cross-section of the product guiding channel, which proportion is equal to the proportion occupied by the carrier in the product channel of the cooling nozzle. Therein, the core piece preferably has the catch and thereon a single-pieced jacket section. Optionally, the core piece with the single-pieced catch and the jacket section is divided into axial sections, each of which single-pieced has an axial section of the catch. Such single-pieced axial sections can be releasably connected to one another, e.g. by means of a clamp connection clasping around the terminal sections of the axial sections. The single-pieced formation of a catch corresponding to the carrier on the core piece of a connecting piece, preferably also single-pieced with the jacket section, has the advantage that forces acting onto the core piece and/or onto the catch are guided directly into the jacket section and are absorbed by the jacket section. The jacket section of the connecting piece on one end can be connected to the extruder and on its opposite end to the cooling nozzle.

The connecting piece, in particular in the aforementioned embodiments, can be rigid, e.g. from metal. Alternatively, the connecting piece can be elastic, e.g. a tubing suitable for foods.

Optionally, the inner and/or the outer wall of the product guiding channel of the connecting piece can be thermally insulated or heated, e.g. to a temperature equal to the outlet temperature of the mass from the extruder or to a temperature higher than the outlet temperature of the mass from the extruder, e.g. to a temperature of 80 to 160° C., preferably 110 to 130° C. The heating of the inner and/or outer wall of the product guiding channel can confer a higher solidity, reduced adhesion properties to a surface of the product channel and/or a different structure than that of the underlying mass to the surface of the mass prior to its entry into the product channel of the cooling nozzle.

Preferably, a conveyor belt as a support for the exiting mass is arranged adjacent to an outlet opening of the cooling nozzle that is arranged opposite of the extruder. Optionally, a forming nozzle can be mounted to the outlet of the product channel of the cooling nozzle, preferably the cooling nozzle with the cross-section of the product channel discharges directly above a conveyor belt. Preferably, the cooling nozzle is arranged in a way that the carrier is at the top, e.g. in an arrangement of the cooling nozzle with its longitudinal axis being approximately horizontally up to an angle of 60° or up to 45° to the horizontal plane, with the outlet of the product channel below its inlet. Preferably, the cooling nozzle is oriented in a way that the carrier is arranged above the longitudinal axis of the inner tube and/or of the inner jacket tube, further preferably the cooling nozzle is oriented in a way that the carrier is arranged symmetrically centrally and above this longitudinal axis.

The cooling nozzle has the advantage that in the process for producing and forming a mass by means of the cooling nozzle, a conveyor belt that is arranged below the nozzle outlet can be a conveyor belt that is not temperature-controlled, cooled or heated, because the exiting mass is uniformly cooled over its volume.

The cooling nozzle allows for the production of a solid mass from an extruded mass by means of quick and uniform cooling and forming into a uniform single-layered layer. The cooled mass preferably has a protein content of at least 30 to 90 wt.-% of the dry mass, preferably 50 to 80 wt.-% of the dry mass, fibrous structures or layer structures that extend along the direction of flow. The final product can have a protein content of e.g. 10 to 50 wt.-% of the total mass.

In the process, the mass is moved through the product channel e.g. at a speed of flow of 0.01 to 550 cm/s, preferably 0.1 to 10 cm/s or 1 to 5 cm/s. The mass can enter into the cooling nozzle at a pressure of e.g. up to 100 bar. The outlet temperature of the mass from the extruder preferably is equal to the inlet temperature into the cooling nozzle, e.g. of 80 to 160° C., preferably 110 to 130° C. The outlet temperature of the mass from the cooling nozzle is e.g. 30 to 120° C., preferably 60 to 95° C.

The inlet temperature of the coolant into the outer and/or into the inner coolant channel amounts to e.g. −10° C. to 50° C., preferably 10 to 30° C.

Preferably, the cooling nozzle has a first cooling device that is configured to convey coolant through the outer coolant channel, and has a second cooling device that is configured to convey coolant through the inner coolant channel. The first cooling device can be connected to the first inlet and to the first outlet of the outer coolant channel, the second cooling device can be connected to the second inlet and to the second outlet of the inner coolant channel. Optionally, the first cooling device and the second cooling device can be formed by a joint cooling device. The first cooling device and the second cooling device are preferably configured independently or equally to generate a coolant flow that is sufficient for a cooling of the mass over the length of the product channel to a temperature of 30 to 120° C., that is sufficient for cooling the mass at a cooling rate of 5 to 130° C./min. Optionally, the first cooling device and the second cooling device can be configured independently from one another, or be equally configured to generate a coolant flow.

This temperature gradient over the length of the inner jacket tube and/or over the length of the inner tube can be determined as heating of the coolant due to the passage through the outer coolant channel or through the inner coolant channel, respectively. In a further preferred embodiment, the coolant flow is guided in counterflow to the direction of flow of the mass. A preferred coolant is water or a mixture of water and glycol.

Preferably, the coolant flow passing through each the outer coolant channel or through the inner coolant channel, respectively, is adjusted to the same inlet temperature.

Preferably, the cooling nozzle is present in a combination with a cleaning device that is connectable to one end of the cooling nozzle. The cleaning device has a pushing element that has a cross-section approximately equal to or smaller than the cross-section of the product channel, and that is slidable in parallel to the longitudinal axis of the cooling nozzle into the product channel by means of a spindle propulsion. Therein, the pushing element in parallel to its longitudinal axis has a longitudinal recess that corresponds to at least the cross-section of the carrier of the cooling nozzle, so that the pushing element can be moved along the longitudinal axis into the product channel, while the longitudinal recess is moved along the carrier. When moving the pushing element into the product channel, a mass stuck therein can be easily pushed out of the opposite open end of the product channel. The pushing element is solidly connected to a spindle nut that engages with a spindle that is supported in a stationary and rotatable manner within a bearing at a bearing plate. The bearing plate is fixed at one end of the cleaning device and is solidly connected to a connector plate by means of a holder, which connector plate along the spindle axis is arranged at the opposite end of the cleaning device. Preferably, the end of the spindle that is opposite of its bearing within the bearing plate is rotatably run on bearings at the connector plate. The holder that connects the connector plate to the bearing plate can e.g. have at least two, preferably 3 rods or a tube. If the holder consists of a tube, the tube preferably has longitudinally running recesses through which the pushing element is accessible, in particular for cleaning of the pushing element. The holder comprises the spindle and preferably the pushing element. The connector plate is releasably connectable to one end of the cooling nozzle, e.g. by means of a flange that protrudes over the connector plate and by means of a clamp that encompasses the flange of the connector plate and a terminal flange of the cooling nozzle. The connector plate can have a centering device that co-operates with a centering device of the cooling nozzle in order to orient the pushing element towards the product channel. The spindle is stationary and rotatably driven within the cleaning device by means of a spindle drive that can e.g. be a motor, a crank or a handwheel, and the spindle moves the spindle nut and the pushing element connected thereto in parallel to the longitudinal axis of the spindle. After inserting the pushing element into the product channel, the product channel acts as linear guide for the pushing element, so that it cannot rotate together with the spindle. Preferably, the cleaning device has a longitudinal guide that engages with a longitudinal recess of the pushing element, so that the pushing element and/or the spindle nut is guided within the cleaning device along the spindle axis in a torque-proof and longitudinally slidable manner. A longitudinal guide can be formed as a rail that extends section by section or entirely along the spindle axis and that is arranged in the radial area in which the pushing element has a recess, e.g. corresponding to the arrangement of the carrier within the product channel. Preferably, the pushing element has a cross-section that is constant over its length.

The pushing element can e.g. consist of plastic or metal.

The invention is now described in more detail with reference to the figures that show in FIG. 1 a preferred embodiment of the cooling nozzle in sectional view along the longitudinal axis, FIG. 2 the cooling nozzle of FIG. 1 in cross-sectional view, FIG. 3 a sectional view along the longitudinal axis of the cooling nozzle with connected adaptor, FIG. 4 a cleaning device according to the invention for the cooling nozzle in sectional view along the longitudinal axis and in cross-sectional view thereto, and FIGS. 5 A), B) and C) a top view along the longitudinal axis onto an embodiment of the cooling nozzle.

Figure 1:
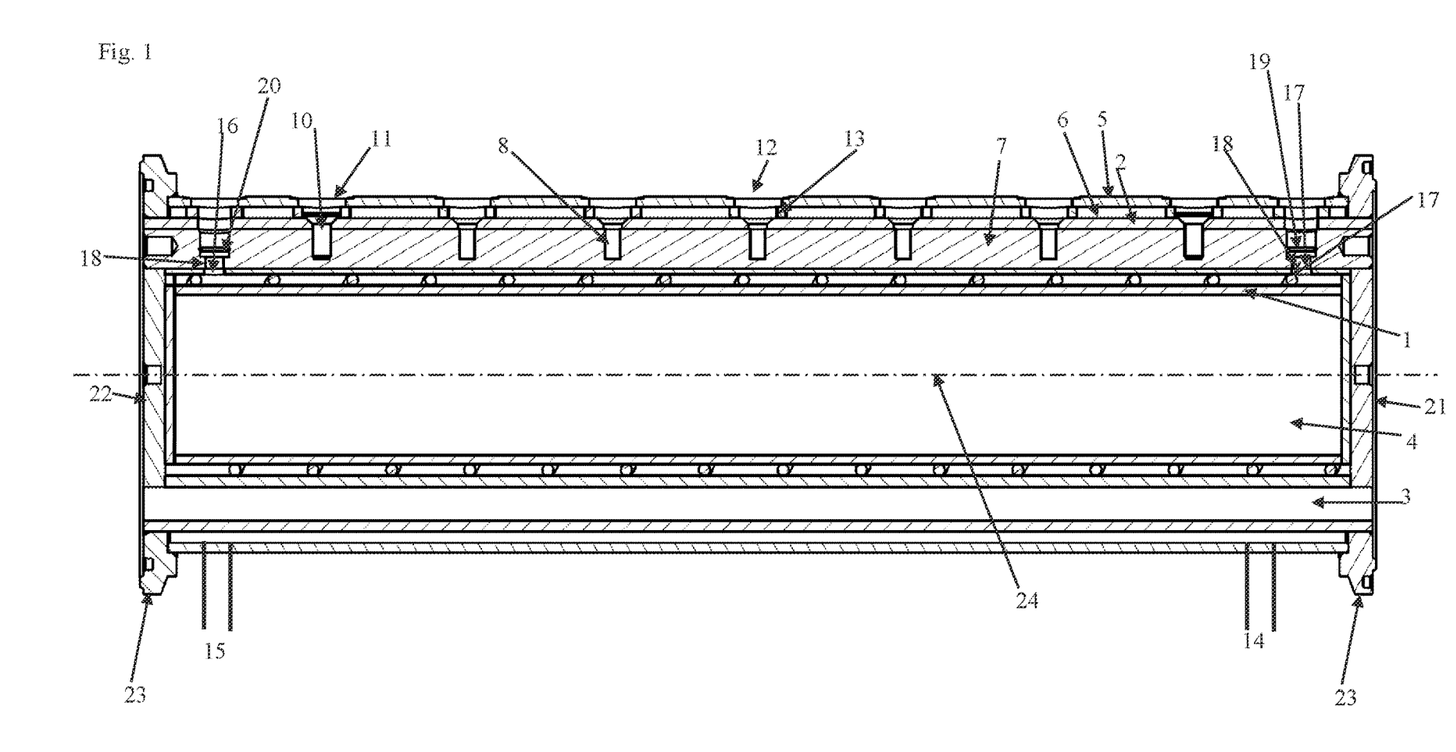

FIG. 1 shows a cooling nozzle having an inner tube 1 that is encompassed at a radial distance by the inner jacket tube 2, which between them form the product channel 3 that is open at the opposite ends or front face surfaces, respectively. The inner tube 1 forms the inner coolant channel 4. The inner jacket tube 2 is encompassed at a distance by the outer jacket tube 5, which between them form the outer coolant channel 6. The inner tube 1 is connected to the inner jacket tube 3 by means of the one carrier 7 that extends over the entire length of the inner tube 1 in parallel to its longitudinal axis 24. In FIG. 1, the carrier 7 is shown in sectional view. The carrier 7 according to the invention has wall surfaces 9 that directly abut on the inner jacket tube 3 and to the inner tube 1 and that are continuous or respectively seamless. The wall surfaces 9, as preferred according to the invention, have a constant form over the length of the inner tube 1 and the inner jacket tube 2, and have a constant distance to one another, and form a constant profile respectively, so that the carrier 7 has a constant cross-section over the length of the inner tube 1 and the inner jacket tube 2. The carrier 7 is releasably connected to the inner jacket tube 2 by means of screws 10. Therein, the screws 10 engage with threaded bore holes 8 within the carrier 7. The heads of the screws 10 are, as preferred, sunk into bore holes within the inner jacket tube 2, so that they do not protrude into the outer coolant channel 6. The outer jacket tube 5 has mounting bore holes 11 which are oriented towards the bore holes within the inner jacket tube 2 and through which the screws 10 are accessible. The mounting bore holes 11 are closable by means of screw caps 12 (not shown) as closures. Between the inner jacket tube 2 and the outer jacket tube 5, annular optional gaskets 13 are arranged that seal the area between a mounting bore hole 11 and the screw 10 against the outer coolant channel 6. The inner tube 1 is connected to the carrier 7 e.g. by welding. Within the outer coolant channel 6, flow guiding elements (not shown) are arranged. The outer coolant channel 6 has a first inlet 14 for coolant at one end of the outer jacket tube 5, and has a first outlet 15 for coolant on the other end that is opposite along the longitudinal axis 24.

The inner coolant channel 4 has a second inlet 16 and has a second outlet 17 for coolant on the other end that is opposite along the longitudinal axis 24. As shown here, the second inlet 16 and the second outlet 17 can each be formed by a bore hole 18 that extends through the carrier 7 and the wall of the inner tube 1 that is adjacent to the carrier 7, wherein one connection line 19 (not shown) each is tightly connected to the bore hole 18, the connection line 19 sealingly extending through the outer jacket tube 5. The connection lines 19 can be fixed in one of the bore holes 18 e.g. within a thread 20.

The terminal cross-sections of the inner coolant channel 4 and the outer coolant channel 6 are closed by means of lids 21, 22. In the alternative to the embodiment shown, a first inlet 14 or a first outlet 15 each for coolant of the outer coolant channel 6 can be arranged in opposite lids 21. In the alternative to the embodiment shown and less preferably, the second inlet 16 or the second outlet 17 for coolant of the inner coolant channel 4 can be arranged together within the same lid 22 or one each in one of the opposite lids 22.

Figure 2:
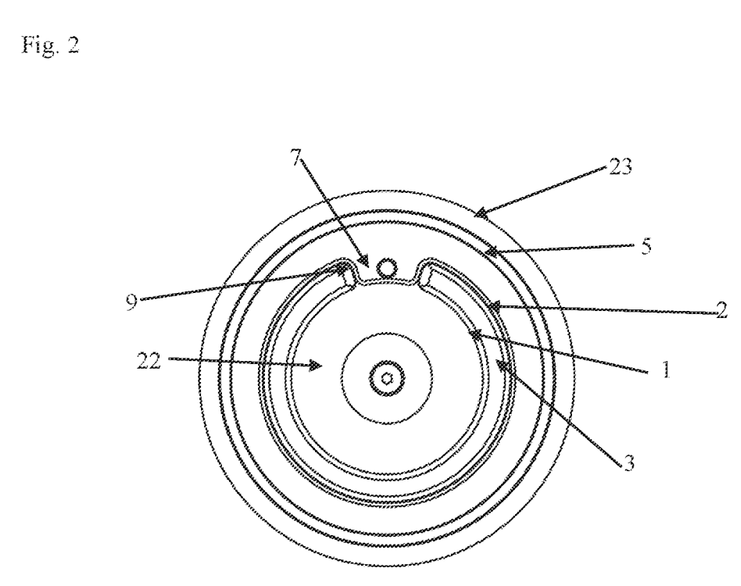

FIG. 2 shows a cross-section of the cooling nozzle of FIG. 1. The wall surfaces 9 of the carrier 7 are plane in the embodiment shown and can extend along two radials that originate from the longitudinal axis 24.

For the connection of the cooling nozzle, a flange 23 can be attached to at least one end, e.g. to the outer jacket tube 5.

Figure 3:
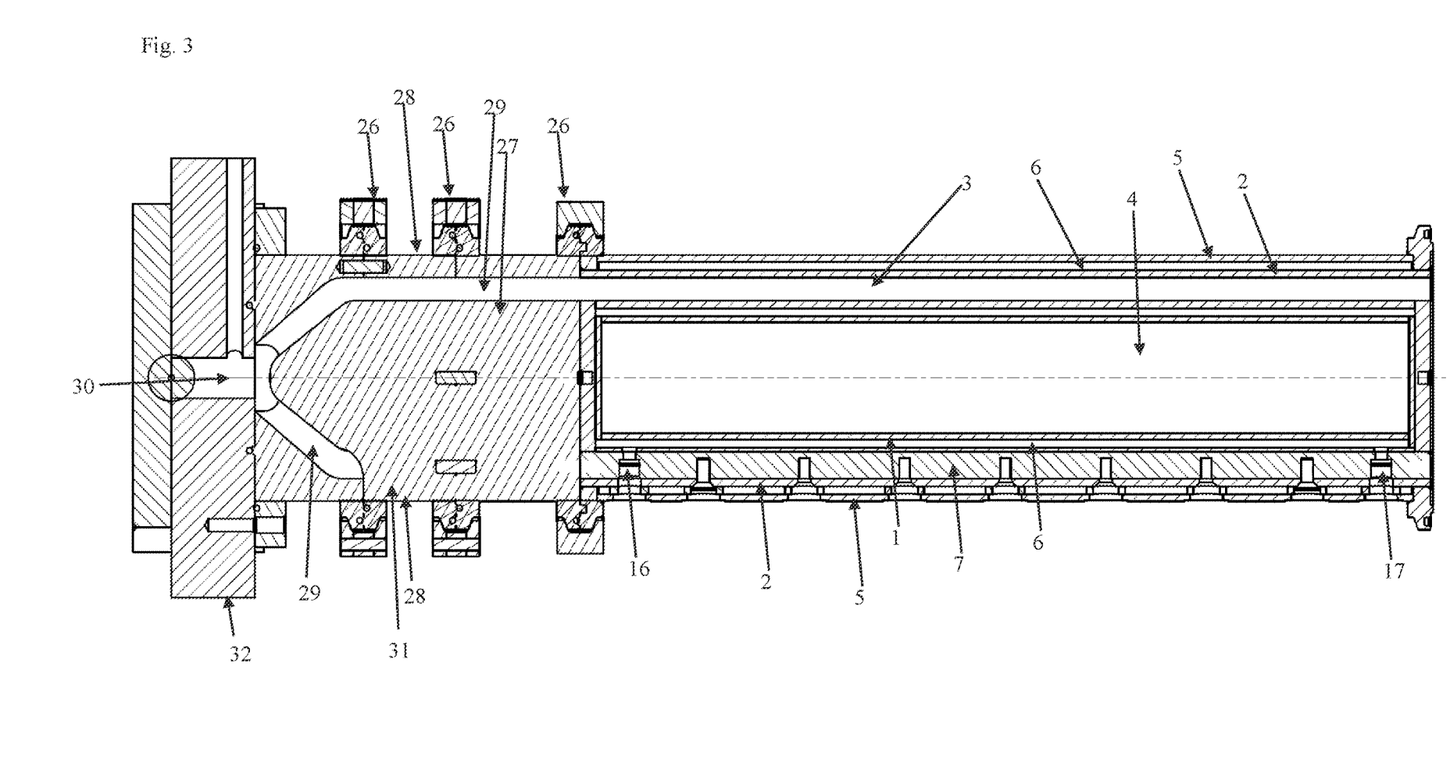

FIG. 3 shows a cooling nozzle that is connected to a connecting piece by connecting the one terminal flange 23 of the cooling nozzle to a flange 25 of the connecting piece by means of a clamp 26. The connecting piece has a core piece 27 within a jacket section 28, which between them within a radial section form a product channel 29 that enlarges from the cross-section of the extruder outlet that can be connected to the opening 30 as a product inlet up to the cross-section of the product channel 3. The core piece 27 has a catch 31 that occupies a cross-section corresponding to that of the carrier 7 and accordingly fills the product channel 29 like the carrier 7. As preferred, the core piece 27 is formed single-pieced with the catch 31 and with the jacket section 28 thereon. The core piece 27 with the single-pieced catch 31 and with the jacket section 28 is divided into axial sections, each of which having single-pieced an axial section of the core piece 27, of the jacket section 28 and between them an axial section of the catch 31. These single-pieced axial segments are releasably connected to one another by means of the clamps 27 that each encompass flanges 25 at the ends of the axial sections. The jacket section 28 of the connecting piece by means of a mounting plate 32 can be connected to an extruder at the end lying opposite of the cooling nozzle.

Figure 4:
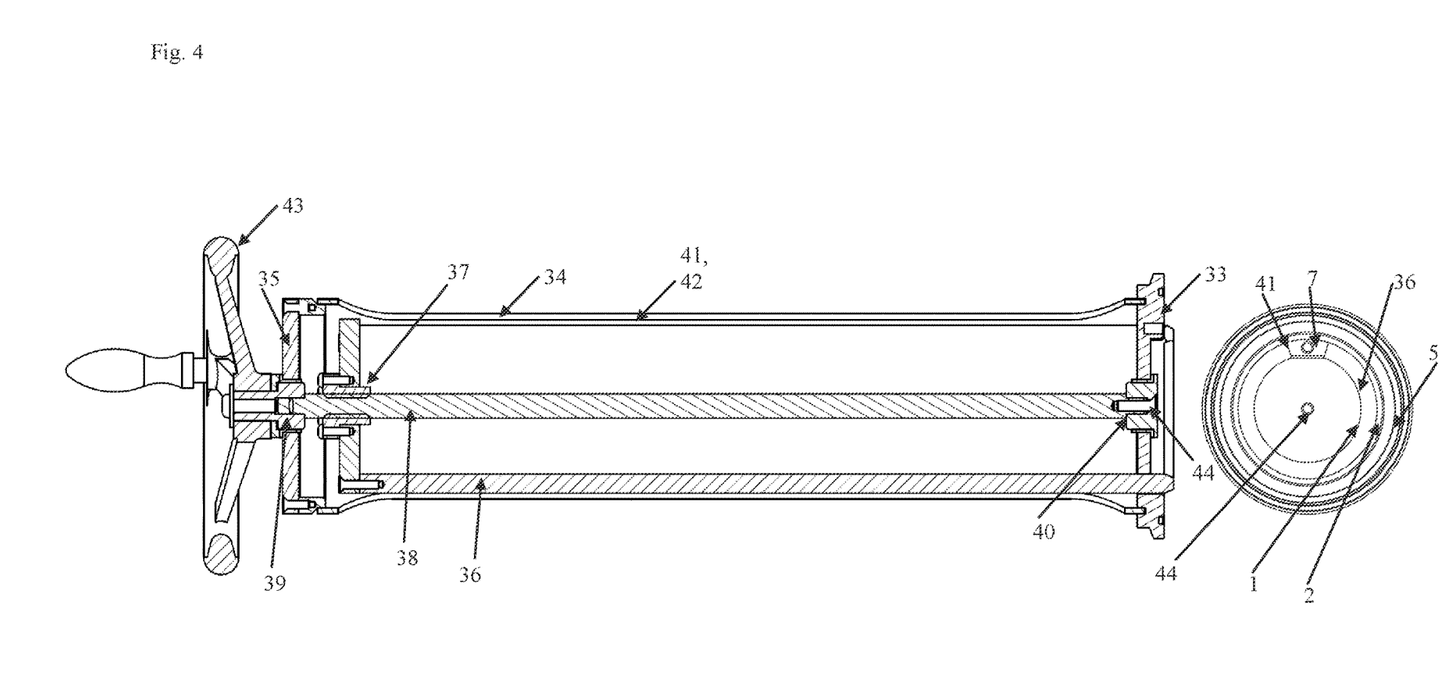

FIG. 4 shows a cleaning device that can be attached by its connector plate 33, e.g. by means of a clamp, to a terminal flange of a cooling nozzle. The connector plate 33 is connected to the bearing plate 35 by the holder 34, shown here as three rods distributed around the circumference. The connector plate 33 together with the bearing plate 35 and the holder 34 form a housing for the pushing element 36 that is connected to a spindle nut 37 engaging the spindle 38. The spindle 38 is rotatably and stationary supported in a spindle bearing 39 that is attached to the bearing plate 35, and at its opposite end is rotatably supported in a bearing 40 at the connector plate 33. The spindle nut 37 or the pushing element 36 is slidably guided along the longitudinal axis of the spindle 38 and is torque-proof according to the preferred embodiment. For the torque-proof guidance of the pushing element 36, the cleaning device has a longitudinal guide 41 that engages with the longitudinal recess 42 of the pushing element 36, wherein the pushing element 36 is slidable along the longitudinal guide 41. The spindle 38 has a handwheel as a rotational drive 43 by which the spindle 38 can be rotated to move the spindle nut 37 and with it the pushing element 36 in parallel to the spindle axis beyond the connector plate 33 and into the product channel of a cooling nozzle connected thereto. The connector plate 33 has a bore hole as centering device 44 that can be used for orienting the cleaning device at a cooling nozzle.

Figure 5:
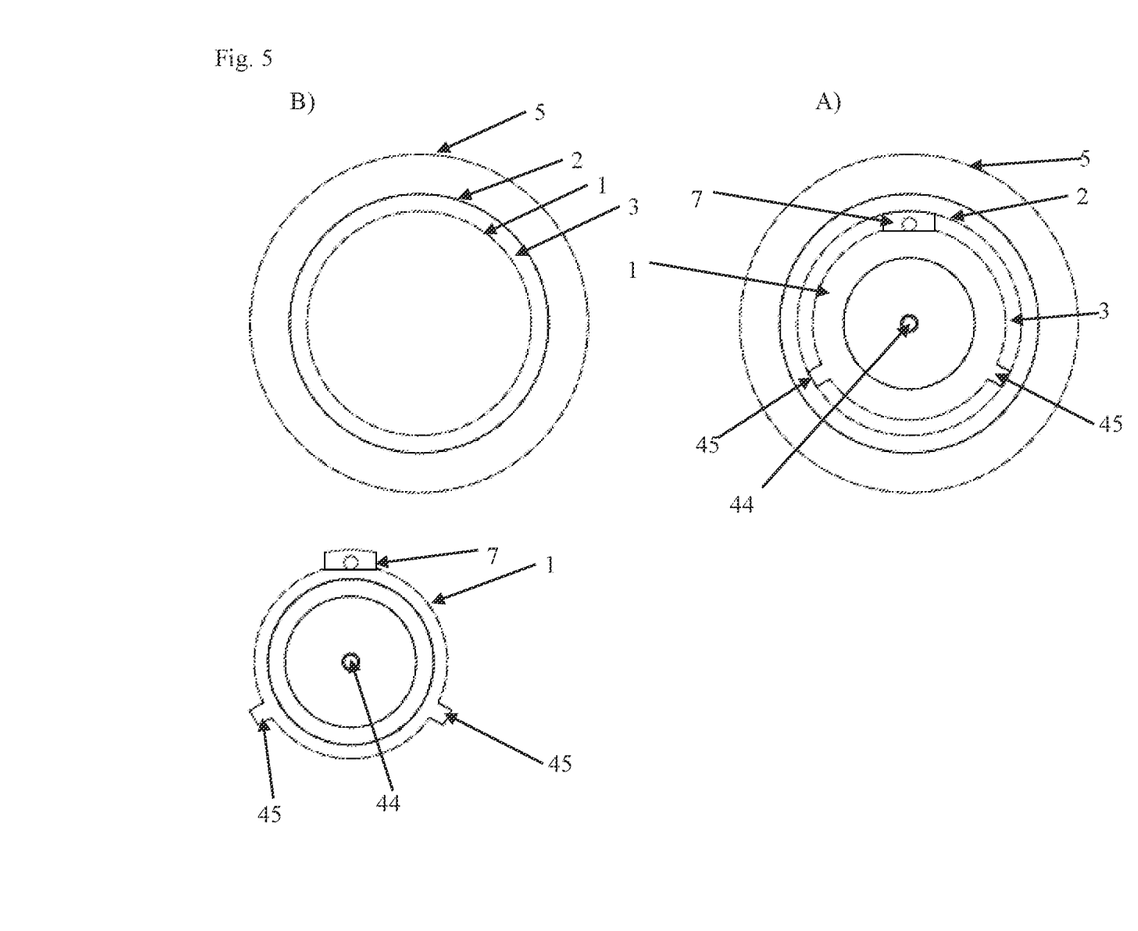

FIG. 5A) shows an embodiment in which the inner tube 1 in addition to the carrier 7 has two webs 45 that together with the carrier 7 are arranged at the same angle over the circumference of the inner tube 1 and that divide the product channel 3 into same-sized radial sections. The webs 45 protrude over the inner tube 1 up to abutting on the inner jacket tube 2. In FIG. 5B), in top view along the longitudinal axis the cooling nozzle without the inner tube 1 is shown, FIG. 5C) shows in top view along the longitudinal axis the inner tube 1 extracted from the cooling nozzle. In the embodiment shown in FIG. 5, the webs 45 divide the product channel both over its entire length and over its radial height. For an easy exchange of the inner tube 1 against another inner tube 1 that has a different outer diameter and preferably has a carrier 7 that extends up to the same radius from its longitudinal axis as does the carrier of another inner tube 1, optionally having at least one web 45, each inner tube is releasably attached within the inner jacket tube 2 only by means of its carrier 7, e.g. is releasably connectable to the inner jacket tube 2 and/or to the outer jacket tube 5.

| Reference numerals: |
| --- |
| 1 inner tube |
| 2 inner jacket tube |
| 3 product channel |
| 4 inner coolant channel |
| 5 outer jacket tube |
| 6 outer coolant channel |
| 7 carrier |
| 8 threaded bore hole |
| 9 wall surface |
| 10 screw |
| 11 mounting bore hole |
| 12 closure/screw cap |
| 13 seal |
| 14 first inlet |
| 15 first outlet |
| 16 second inlet |
| 17 second outlet |
| 18 bore hole |
| 20 thread |
| 21 lid |
| 22 lid |
| 23 flange |
| 24 longitudinal axis |
| 25 connecting piece flange |
| 26 clamp |
| 27 core piece |
| 28 jacket section |
| 29 product channel |
| 30 opening |
| 31 catch |
| 32 mounting plate |
| 33 connector plate |
| 34 holder |
| 35 bearing plate |
| 36 pushing element |
| 37 spindle nut |
| 38 spindle |
| 39 spindle bearing |
| 40 bearing |
| 41 longitudinal guide |
| 42 longitudinal recess |
| 43 torque drive |
| 44 centering device |
| 45 web |

The invention claimed is:
1. Cooling nozzle for use in the production of foods, comprising:
an inner tube having an inner volume that forms an inner coolant channel;
an inner jacket tube arranged at a distance around the inner tube;

a product channel confined between the inner jacket tube and the inner tube;

an outer jacket tube arranged at a distance around the inner jacket tube, the outer jacket tube forming an outer coolant channel that encompasses the product channel;

a carrier dividing a cross-section of the product channel, the carrier extending in parallel to a longitudinal axis of the inner tube over an entire length of the product channel, wherein wall surfaces of the carrier are seamless and continuously abut on the inner tube and on the inner jacket tube, wherein the carrier is connected to the inner jacket tube by screws that engage in threaded bore holes arranged within the carrier and that abut on the inner jacket tube, and in that in the outer jacket tube mounting bore holes are arranged that cover the threaded bore holes and that are reversibly closable by closures.

2. Cooling nozzle for use in the production of foods, comprising:

an inner tube having an inner volume that forms an inner coolant channel;

an inner jacket tube arranged at a distance around the inner tube;

a product channel confined between the inner jacket tube and the inner tube;

an outer jacket tube arranged at a distance around the inner jacket tube, the outer jacket tube forming an outer coolant channel that encompasses the product channel;

a carrier dividing a cross-section of the product channel, the carrier extending in parallel to a longitudinal axis of the inner lube over an entire length of the product channel, wherein wall surfaces of the carrier are seamless and continuously abut on the inner tube and on the inner jacket tube, wherein the carrier on its opposite ends has bore holes that form an inlet and an outlet for the inner coolant channel, wherein the bore holes are guided through the inner jacket tube and the inner tube and wherein connection lines that are sealingly guided through bore holes within the outer jacket tube are connected to the bore holes of the carrier.

3. Cooling nozzle according to claim 2, wherein the carrier has a cross-section that is constant along the entire length of the product channel.

4. Cooling nozzle according to claim 2, wherein the carrier is releasably connected to the inner jacket tube.

5. Cooling nozzle according to claim 2, wherein the outer cooling channel has an inlet and an outlet to which a first cooling device is connected, wherein a second cooling device is connected to the inlet and outlet of the carrier, wherein the first cooling device and the second cooling device independently from one another are configured to generate a coolant flow that is sufficient for cooling a mass in the product channel at a cooling rate of from 5 to 130° C./min.

6. Cooling nozzle according to claim 2, directly connected to an outlet of an extruder.

7. Cooling nozzle according to claim 2, connected to an outlet of an extruder by a connecting piece that forms an at least sectionally annular product guiding channel between an inner wall and an outer wall spaced therefrom, and in that the inner wall and/or the outer wall is heated to a temperature that is higher than an outlet temperature of a mass from the extruder.

8. Cooling nozzle according to claim 2, at one end being releasably connectable to a connecting piece having a core piece within a jacket section, which between them within a radial section form a product guiding channel and which are connected by a catch, wherein a cross-section of the product guiding channel is arranged matching the cross-section of the product channel.

9. Cooling nozzle according to claim 8, wherein the core piece is formed with the catch and the jacket section thereon as a single piece.

10. Cooling nozzle according to claim 2, oriented in a way that the carrier is arranged above the longitudinal axis of the inner tube and/or of the inner jacket tube, and in that an outlet of the product channel is arranged above a conveyor belt.

11. Cooling nozzle according to claim 2, comprising at least one web that extends over a length of the inner tube and in parallel to its longitudinal axis and that protrudes over the inner tube, wherein the inner tube is fixedly connected to the inner jacket tube and/or the outer jacket tube exclusively by the carrier.

12. Cooling nozzle according to claim 11, comprising at least two webs of the at least one web that are arranged around the circumference of the inner tube, each in equal distance to one another and to the carrier.

13. Cooling nozzle according to claim 11, wherein the web extends up to a distance of at maximum 2 mm from the inner jacket tube.

14. Cooling nozzle for use in the production of foods, comprising:

one inner tube having an inner volume that forms an inner coolant channel;

an inner jacket tube arranged at a distance around the one inner tube;

a product channel confined between the inner jacket lube and the one inner tube;

an outer jacket tube arranged at a distance around the inner jacket tube, the outer jacket tube forming an outer coolant channel that encompasses the product channel;

a carrier dividing a cross-section of the product channel the carrier extending in parallel to a longitudinal axis of the one inner tube over an entire length of the product channel, wherein wall surfaces of the carrier are seamless and continuously abut on the one inner tube and on the inner jacket tube; and another inner tube that is exchangeable for the one inner tube and has another inner volume and another carrier, wherein the another inner tube has a different outer diameter than the one inner tube.

15. Cooling nozzle for use in the production of foods, comprising:

an inner tube having an inner volume that forms an inner coolant channel;

an inner jacket tube arranged at a distance around the inner tube;

a product channel confined between the inner jacket tube and the inner tube;

an outer jacket tube arranged at a distance around the inner jacket tube, the outer jacket tube forming an outer coolant channel that encompasses the product channel;

a carrier dividing a cross-section of the product channel, the carrier extending in parallel to a longitudinal axis of the inner tube over an entire length of the product channel, wherein wall surfaces of the carrier are seamless and continuously abut on the inner tube and on the inner jacket tube, wherein the cooling nozzle is mounted to a connector plate, comprising a bearing plate connected to the connector plate by a holder and a spindle that is rotatably and stationarily supported in a spindle bearing, wherein a spindle nut engages the spindle and is connected to a pushing element that is slidable lengthwise along the spindle, wherein the pushing element has a cross-section approximately equal to or smaller than the cross-section of the product channel and has a longitudinal recess having a cross-section approximately equal to or larger than a cross-section of the carrier.

16. Cooling nozzle for use in the production of foods, comprising:

an inner tube having an inner volume that forms an inner coolant channel;

an inner jacket tube arranged at a distance around the inner tube;

a product channel confined between the inner jacket tube and the inner tube;

an outer jacket tube arranged at a distance around the inner jacket tube, the outer jacket tube forming an outer coolant channel that encompasses the product channel;

a carrier dividing a cross-section of the product channel, the carrier extending in parallel to a longitudinal axis of the inner tube over an entire length of the product channel, wherein wall surfaces of the carrier are seamless and continuously abut on the inner tube and on the inner jacket tube, a pushing element that connected to a spindle nut, extending into the product channel and engaging a spindle, the spindle being rotatably and stationarily supported in a spindle bearing that is attached to a bearing plate, the bearing plate being connected by a holder to a connector plate that is connected to the cooling nozzle.

17. Cooling nozzle according to claim 16, comprising an extruded mass moving through the product channel, coolant moving through the inner coolant channel and through the outer coolant channel, the cooling nozzle being arranged to lay the mass onto a conveyor belt in order to form a single-layered and continuous layer.

18. Cooling nozzle according to claim 17, connected through a connecting piece arranged between an outlet of an extruder and an inlet of the product channel, which connecting piece forms an at least sectionally annular product guiding channel between an inner wall and an outer wall spaced-apart therefrom, and in that the inner wall and/or the outer wall is heated to a temperature that is higher than an outlet temperature of the mass from the extruder.

19. Cooling nozzle according to claim 17, wherein the cooling nozzle can be lengthened or shortened by at least one axial section in order to change the structure of the product and/or when extruding a different mass or respectively after a change of product.

* * * * *